United States Patent [19]
Conner et al.

[11] 3,736,051
[45] May 29, 1973

[54] PHOTOGRAPHIC APPARATUS FOR MOTION PICTURE PROJECTION

[75] Inventors: James M. Conner, Mamaroneck, N.Y.; Henry J. Salvador, Hasbrouck Heights, N.J.

[73] Assignee: Polaroid Corporation, Cambridge, Mass.

[22] Filed: Aug. 24, 1971

[21] Appl. No.: 174,374

[52] U.S. Cl. .................. 352/72, 352/166, 242/198
[51] Int. Cl. ............................................. G03b 23/02
[58] Field of Search ................... 352/72, 74, 75, 76, 352/78, 166, 176, 123; 242/198; 274/4 E

[56] References Cited

UNITED STATES PATENTS

| | | | |
|---|---|---|---|
| 3,488,112 | 1/1970 | Hickl | 352/72 |
| 1,437,989 | 12/1922 | Nelson | 352/75 |
| 2,504,317 | 4/1950 | Frankel | 352/74 |
| 2,872,842 | 2/1959 | Grass | 352/75 |
| 2,844,991 | 7/1958 | Badgley | 352/75 |
| 2,944,474 | 7/1960 | Dennis | 95/11 UW |
| 3,439,919 | 4/1969 | Laa | 274/4 E |
| 3,480,354 | 11/1969 | Fukuda | 352/123 |
| 3,547,373 | 12/1970 | Bundshuh | 242/197 |
| 3,592,537 | 7/1971 | Kakiuchi | 352/72 |
| 3,601,558 | 8/1971 | Sugaya | 274/4 E |
| 3,608,455 | 9/1971 | Downey | 95/13 |

FOREIGN PATENTS OR APPLICATIONS

| | | | |
|---|---|---|---|
| 1,162,682 | 8/1969 | Great Britain | 242/198 |
| 4,428,024 | 11/1969 | Japan | 242/198 |

Primary Examiner—John M. Horan
Assistant Examiner—Alan Mathews
Attorney—Charles Mikulka, Robert F. Peck, Stanley H. Mervis et al.

[57] ABSTRACT

Projector for use with a motion picture film cassette, employing a housing having a front viewing face and a cassette-receiving cavity in communication with the top surface of the housing. A door member mounted at the rear of the opening and configured to block the opening when pivoted into closing position thereacross, carries a cassette-receiving guide which is adapted to receive the cassette from the front of the projector when the door is in its open position and to carry it to an operative location in the cavity when the door is pivoted to its closed position. The door is adapted to displace a drive mechanism of the apparatus into operative relation with the cassette, and the guide is coupled to the door through a lost motion member such that the cassette remains fixed in its operative location during engagement and disengagement of the drive mechanism. Additionally, a handle member is pivotally attached to the apparatus for selective displacement from a first position flush with a surface of the housing to a depressed position where it effects displacement of the door from its closed position and to an upright position where it is accessible for carrying of the unit.

16 Claims, 8 Drawing Figures

INVENTORS
JAMES M. CONNER
HENRY J. SALVADOR
BY Brown and Mikulka
and
David R. Thornton
ATTORNEYS

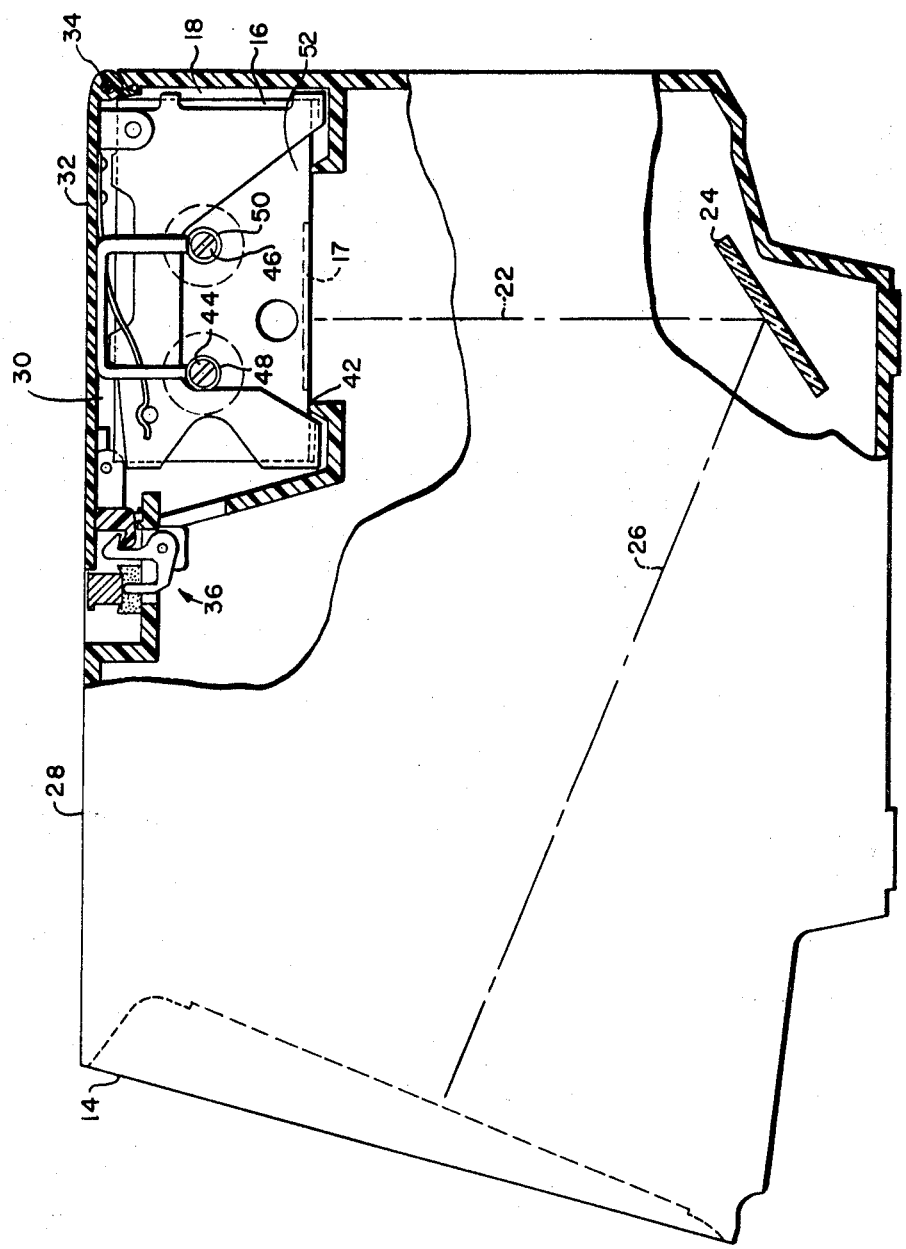

INVENTORS
JAMES M. CONNER
HENRY J. SALVADOR
BY Brown and Mikulka
and
David R. Thornton
ATTORNEYS

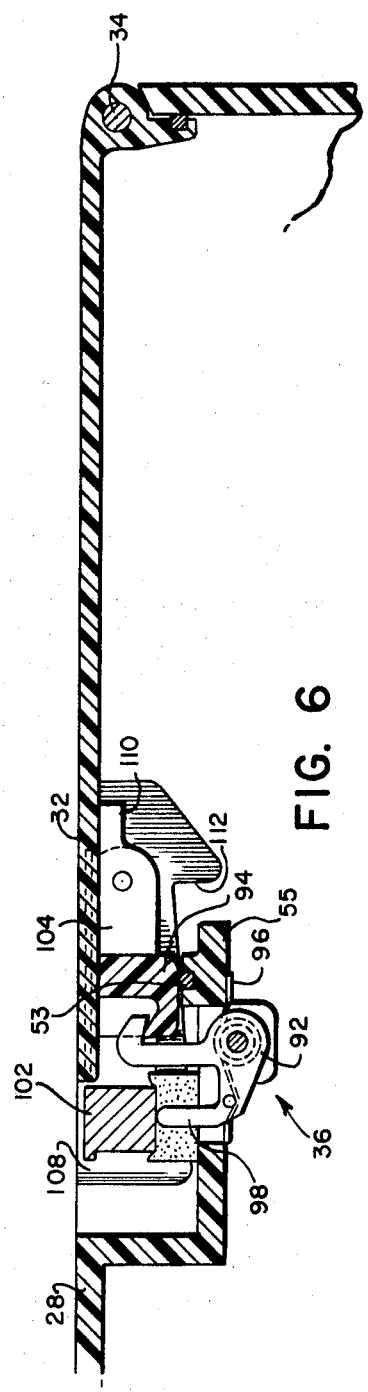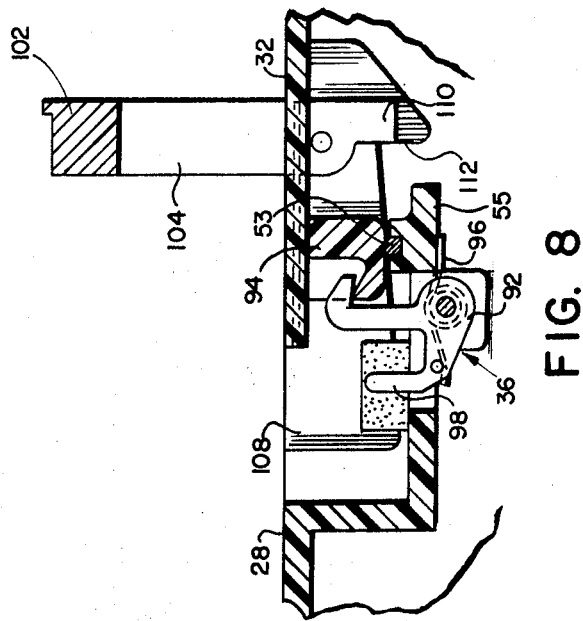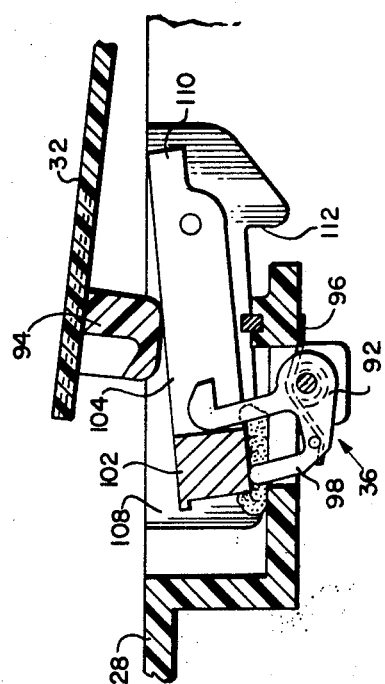

PHOTOGRAPHIC APPARATUS FOR MOTION PICTURE PROJECTION

BACKGROUND OF THE INVENTION

1. Field of the Invention

This invention relates to photographic apparatus and more particularly to photographic apparatus adapted for operation of a motion picture film cassette.

2. Prior Art

In motion picture photography with which the present application is particularly concerned, film cassettes have attained wide use inasmuch as they eliminate direct handling of the film by the operator. However, such cassettes place additional burdens on the camera and projector apparatus. For example, the apparatus must provide a suitable arrangement for insertion and removal of the cassette from an operative location within the interior of the unit. Such arrangements should provide positive location of the cassette in its operative position and should be conveniently located with respect to other operational portions of the apparatus so as to be easily accessible to the operator. Moreover, the loading arrangements are further complicated inasmuch as motion picture film cassettes conventionally provide operative elements accessible from adjoining surfaces, for example, a film gate at one edge and film spools at the cassette side such that the apparatus must interact with the cassette in each of these orthogonal planes.

Additionally, the projector apparatus of the present invention is intended for use with multi-purpose cassettes, such as described in copending application Ser. No. 755,901 of E. H. Land filed Aug. 28, 1968, which are designed for exposure, processing and projection without removal of the film from the cassette. Consequently, the apparatus is adapted for facilitating development as well as projection of the film strip carried by the cassette, and hence, the loading arrangement should also be effective to exclude light from entering the apparatus in the vicinity of the cassette.

An important object of this invention, therefore, is to provide improved photographic apparatus for operation of a motion picture film cassette.

Another primary object of this invention is to provide improved photographic apparatus for facilitating the insertion of a motion picture film cassette into and its subsequent removal from an operative location within the apparatus.

A further object of this invention is to provide photographic apparatus adapted to facilitate the location of a motion picture film cassette within the interior of the apparatus housing in operative relation with components of the apparatus.

Still another object of this invention is to provide photographic apparatus, for use with a photographic film cassette, employing a handle adapted for carrying of the unit and operation of its cassette loading mechanism.

A still further object of this invention is to provide photographic projector apparatus employing a cassette loading mechanism which additionally provides a light sealing arrangement.

SUMMARY OF THE INVENTION

The apparatus of the invention, which is particularly adapted for use with the motion picture film cassettes for projection of images of the film carried therein, comprises a housing having an opening adapted to receive such cassette and a pivotally mounted closure member configured to block the opening when pivoted into position thereacross. It also includes cassette-receiving means coupled to the closure member and adapted to receive such cassette when the closure member is in an open position and for positioning it within the interior of the housing in an operative location when the closure member is pivoted to its closed position.

In the preferred embodiment, the photographic apparatus is a viewer adapted for projection of images recorded on the film strip carried by a motion picture film cassette to a front viewing-face of the apparatus. A cassette-receiving chamber is disposed within the viewer housing in communication with a top surface thereof, and a door member is pivotally mounted at the rear of the opening. A guide member mounted on the underside of the door, is configured to receive the cassette from the front of the housing when the door is in its open position and to automatically position it within the cassette-receiving chamber when the door member is pivoted to its closed position. Additionally, a gasket-like member configured for peripheral engagement with the door member excludes light from entering the chamber in the vicinity of its cassette-receiving opening.

During its closing, the door member is adapted to couple a drive mechanism of the viewer to the film spools of the cassette. Further, the guide member is attached to the door through a lost motion member such that, during closing, the cassette is positioned in its operative location prior to engagement of the drive mechanism and remains fixed in this position subsequent to disengagement of the drive mechanism.

Additionally a handle, is displaceably mounted on the viewer for displacement between an upright position wherein it provides means for carrying of the viewer and a depressed position wherein it effects displacement of the cassette-loading door from its closed position. Preferably, the handle is a U-shaped structure having a pair of spaced parallel arm members depending from a centrally located hand engageable portion. At their distal ends, the arm members are pivotally attached to the top surface of the viewer and coupled to a door-latch thereof such that the hand engageable portion is pivotable from a storage position flush with the top surface to a position above this surface, where it is available for carrying of the unit, and to position slightly below this surface, where it effects release of the door-latch.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof will best be understood in the following description of the preferred embodiment when read in connection with the accompanying drawings wherein like numbers have been employed in the different figures to denote the same parts and wherein:

FIG. 2 is a diagrammatic cut-away side elevation of the viewer of FIG. 1, partially illustrating its internal construction;

FIG. 6 is a fragmentary view illustrating the door-latch arrangement;

FIG. 7 is a fragmentary view depicting operation of the latch arrangement shown in FIG. 6; and FIG. 8 is a fragmentary view illustrating the position of the apparatus handle when it is located in position for carrying of the apparatus.

DESCRIPTION OF THE PREFERRED EMBODIMENT

Figure 1:
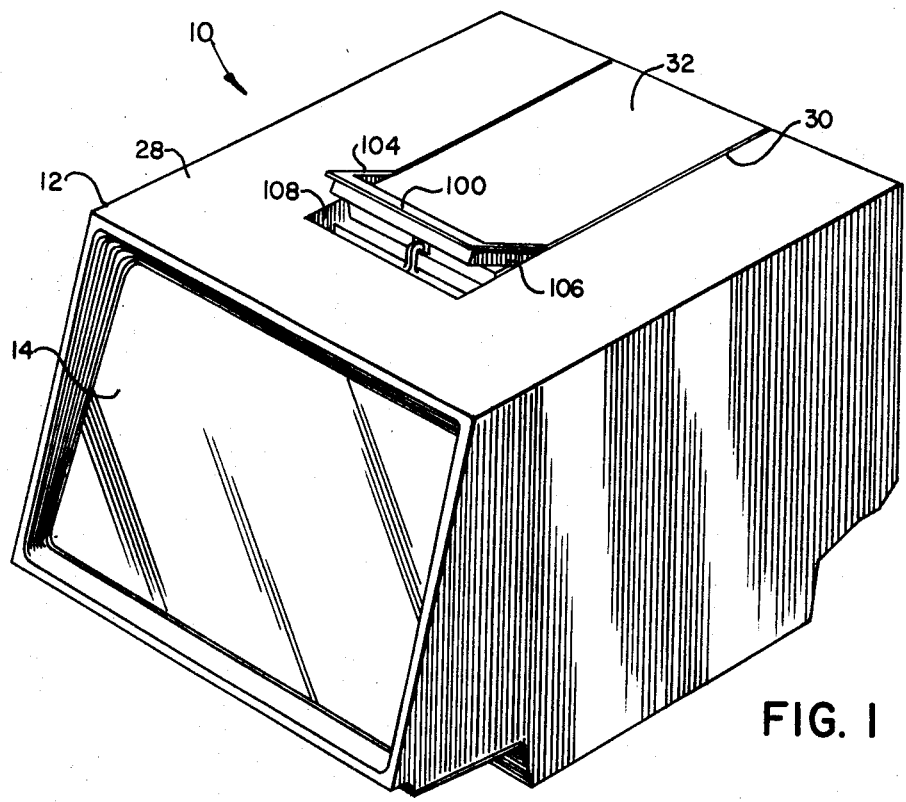
FIG. 1 is a diagrammatic view in perspective of a motion picture viewer embodying the features of this invention.

As shown in FIGS. 1 and 2, the photographic apparatus preferably takes the form of a rear projection viewer including a box shaped housing 12 having a front viewing-face or screen 14. Positioned within housing 12, in a cassette-receiving chamber or well 18, is a motion picture film cassette or magazine 16 having its film gate 17 in optical alignment with the optical axis of the viewer for projection of film images by conventional means (not shown) downwardly along optical path 22 to mirror 24 and therefrom, along path 26 to the rear of screen 14.

Cassette 16 is a motion picture film cassette comprising a generally parallelepiped casing, enclosing a motion picture film (not shown) mounted on a pair of film spools (not shown) for transport across a cassette opening or film gate 17 which is disposed in the lower edge 42 of the casing. Access to the spool shafts 44 and 46 is provided through openings 48 and 50 of the casing side 52.

The cassette-receiving well 18 extends to and is in communication with opening 30 of the top surface 28 of the viewer, and a closure member or door 32 is pivotally mounted at the rear edge of opening 30 for controlling access to well 18. Hence, the door 32 is mounted on shaft 34 for pivotal motion from a closed position, blocking the opening 30, to an open position permitting insertion and removal of cassette 16. Latching means 36, later described in detail, secures door 32 in its closed position.

Figure 4:
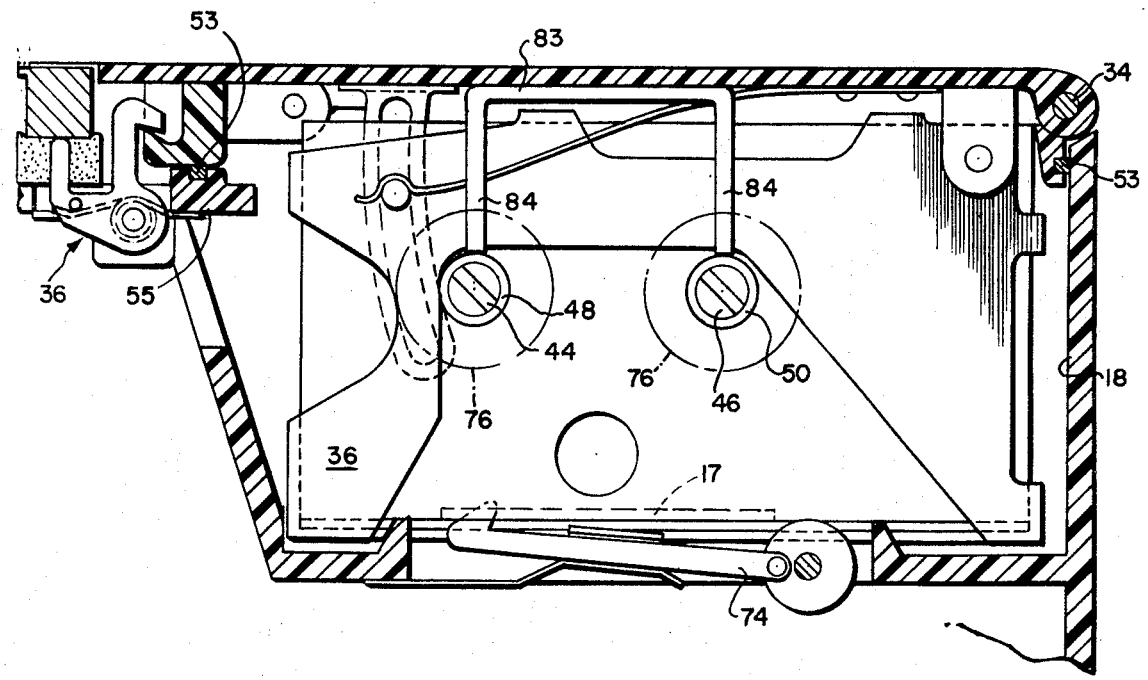
FIG. 4 is a fragmentary view illustrating the operative relation of the cassette with other elements of the viewer.
Figure 5:
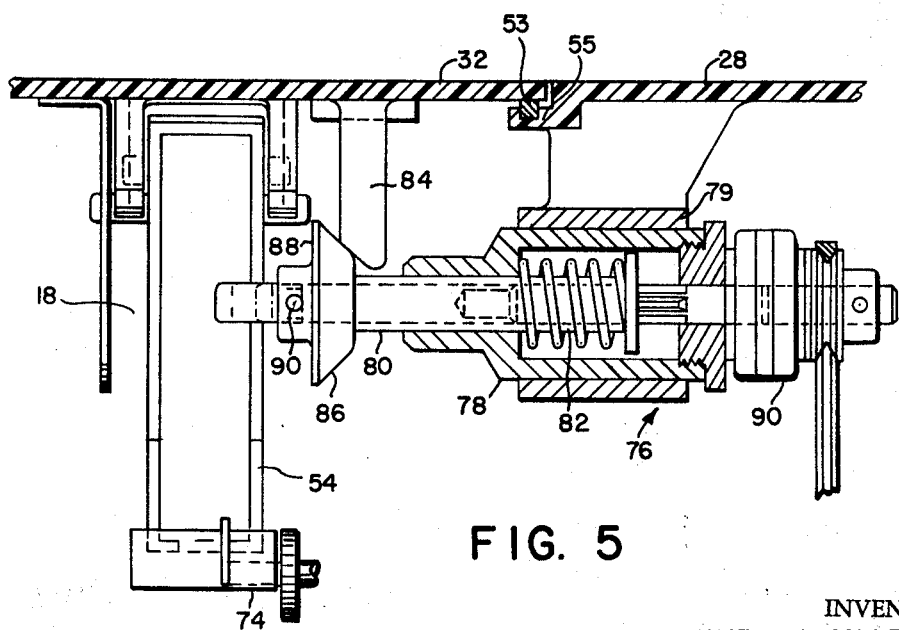
FIG. 5 is a fragmentary sectional view illustrating the spool drive mechanism employed in the viewer of FIG. 1.

Inasmuch as the apparatus is intended for use with multi-purpose cassettes such as those described in the aforementioned copending application, the viewer is adapted for development of the film carried within the cassette. Hence, it includes means (not shown) for selectively excluding light from entering the cassette well 18 from the interior of the apparatus so as to effectively provide a light-tight well (as for example, by means of a displaceably mounted shutter, not shown, for selectively sealing the aperture plate 72 of the well 18) and includes means for excluding light from entering the cassette well 18 in the proximity of the door 32. Hence, a sealing gasket 53 of elastomeric material or the like is disposed on the door member or adjoining areas of the housing 12, as shown in FIGS. 4 and 5. Other sealing arrangements for the exterior of chamber 18 are also possible, for example, the overlap between the door 32 and shelf-like portions of surface 28 such as shown at 55 may be suitable.

Figure 3:
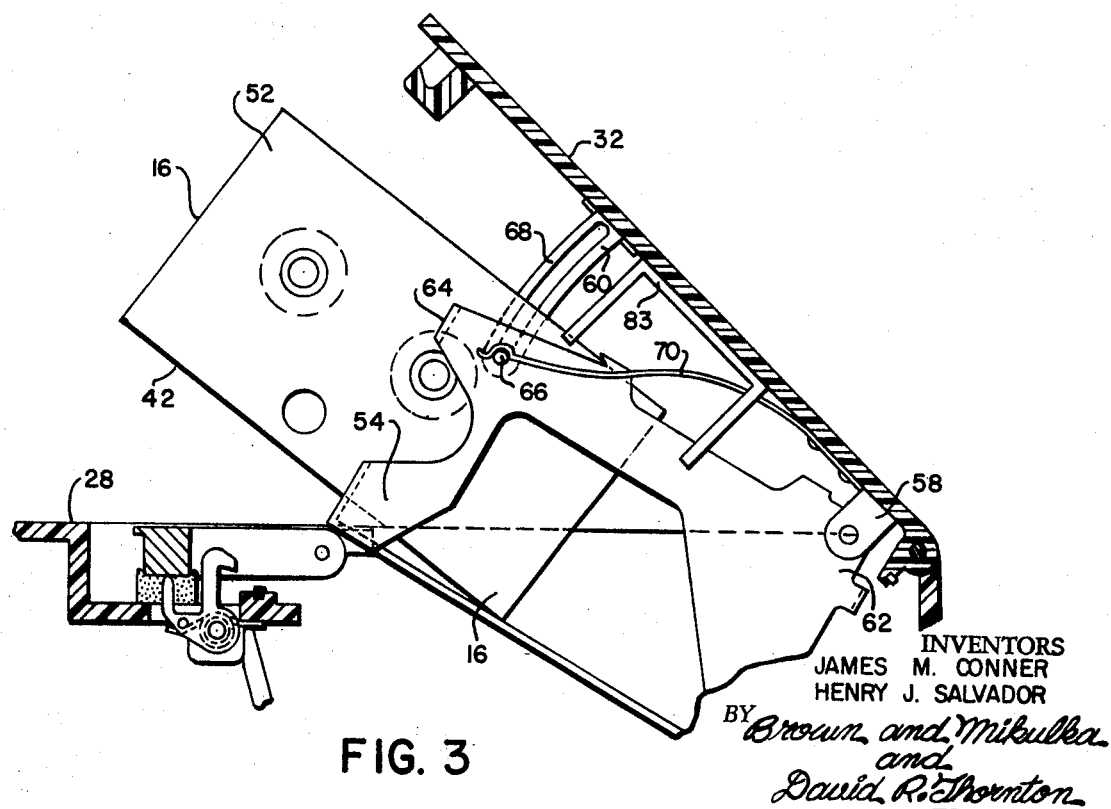
FIG. 3 is a fragmentary view illustrating the operation of the cassette-loading mechanism employed in the viewer of FIG. 1.

A guide member or cassette-receiving sleeve 54 is coupled to the underside of the door 32 and is adapted to receive cassette 16 when the door is in its open position, as shown in FIG. 3, and to carry it into pocket 18 and locate it therein in operative relation to other components of the apparatus when the door is pivoted to its closed position as shown in FIG. 4.

In its operative position the lower edge 42 of the cassette 16 is located at the bottom surface 57 of the well 18 with its film gate 17 in alignment with an aperture plate 72 and its film strip (not shown) in engagement with a conventional claw 74. Additionally, the cassette 16 is in operative relation to a projection lamp (not shown) which is adapted to project film images along optical path 22 and to screen 14. Further, as later explained in detail in regard to FIG. 5, the spool shafts 44 and 46 are disposed in engagement with appropriate drive mechanisms 76.

The sleeve 54, which comprises an open ended container adapted to substantially conform to the dimensions of the cassette 16, is coupled to the underside of the door 32 by a pair of spaced mounting members 58 and 60 which permit limited pivotal motion between the sleeve and the door. At its interior end 62, the sleeve 54 is coupled to the member 58 for pivotal motion thereto whereas at its forward end 64, it is coupled to member 60 in an arrangement providing lost motion coupling between the sleeve and the door. In this regard, a shaft or lug 66 of sleeve 54 extends within an elongated slot 68 of member 60 and thereby permits limited translational movement between the sleeve and the member. Additionally, the sleeve 54 is biased downwardly from the door 32 by means of a leaf spring 70 such that the sleeve leads the door during closing of the latter and lags the door during the opening thereof.

When the door 32 is open as shown in FIG. 3, the sleeve 54 is drawn partially out of pocket 18 and positioned for insertion or removal of the cassette 16 from the front of the viewer. With the door in this position, the cassette 16 may be slid rearwardly into sleeve 54 for loading purposes and slid in a forwardly direction for unloading. Consequently, the loading arrangement most advantageously facilitates loading of the projector from the operative or viewing end of the apparatus.

Upon closing the door 32, the cassette 16 is automatically carried into the pocket 18 and seated therein in operative relation with the aperture plate 72 and the claw mechanism 74 at the bottom of the pocket as shown in FIG. 4. Additionally, closing of the door 32 displaces a pair of spool drive mechanisms 76, one of which is shown in detail in FIG. 5, into engagement with the spool shafts 44 and 46. Hence, the structure provides means responsive to movement of the loading mechanism for displacing the spool driving means of the projector into or out of pocket 18 for engagement with or disengagement from the cassette 16 when the latter is positioned therein.

As shown in FIG. 5, the drive mechanism 76 is mounted for rotation within a bearing sleeve 79 which is fixedly attached to the underside of the top viewer surface 28. Each drive mechanism 76 includes a sleeve 78 journaled in bearing sleeve 79 for rotational motion with respect thereto. A drive shaft, 80, which carries a collar-like cam 88 is slideably mounted within sleeve 78 and is keyed thereto by conventional means (not shown) so as to rotate therewith. Hence, the shaft 80 is adapted for translational motion with respect to sleeve 78 so as to permit lateral displacement of the shaft with respect to cassette pocket 18. In this regard, the shaft 80 is biased by a spring 82 in a direction away from pocket 18. Attached to the door member 32, is a U-shaped member 83 (shown more clearly in FIG. 4) which carries a pair of depending arms 84 adapted to operatively engage the inclined surface 86 of each collar member 88 to cam each shaft 80 towards pocket 18 for coupling engagement with the cassette spools when the door is closed. As shown, collar 88 may be fixedly mounted on shaft 80 for rotational motion therewith by a pin 90 or the like. Alternatively, retaining rings (not shown) may be employed to limit the translational motion of collar 88 with respect to shaft 80 while permitting rotational motion thereto. Finally, a conventional clutch arrangement 90 is employed to drive the unit from any conventional power means (not shown). The latter may also be utilized to drive the claw 74.

Displacing of the drive means in accordance with door movement in conjunction with the lost motion means and downward bias of guide member 54 seats the cassette in its operative position prior to the lateral engagement of the drive and retains it in such position for a time subsequent to disengagement. Hence, drive engaging arms 84 position the drive mechanism 76 in engagement with the cassette 16 during the interval when the door moves relative to guide 54, or that is only when the door 32 is close to its closed position. Stated otherwise, the drive is engaged during the final stages of movement of the door to its closed position and is disengaged or released during the initial stages of movement of the door to its open position. However, since the sleeve 54 leads the door during its closing and lags the door during its opening in accordance with its lost motion and spring bias arrangement, the cassette is retained in a fixed position during this engagement and disengagement.

As previously indicated, door 32 is retained in its closed position by a latch mechanism 36 which as shown in FIGS. 6, 7 and 8, includes a latch member 92 pivotally mounted to housing 12 and adapted for automatically engaging a depending, hook-like arm 94 of the door 32 when the latter is closed. This engagement is effected by a spring 96 which biases latch member 92 toward arm 94. Additionally, latch member 92 includes an extended arm 98 configured for effecting pivotal motion of the latch member out of locking engagement and release of the door 32 in accordance with downward movement of the arm member 98 as shown in FIG. 7.

The latch release is accomplished in this embodiment by a U-shaped handle member 100 (see FIG. 1) which includes a hand engageable portion or bar 102 having a pair of depending arms 104 and 106, which are pivotally mounted to the top surface 28 of housing 12 to permit pivotal motion of the handle thereto. Preferably, the surface 28 includes a recess 108 within which handle 100 is stored, flush with the top surface, and within which the bar 102 may be depressed below the top surface for effecting release of the door member 32. For carrying of the unit, the bar 102 is pivoted to a location above the surface 28 as shown in FIG. 8 wherein arm members 104 and 106 are in a substantial upright position and the bar 102 is properly located to permit grasping of it by an operator. One or both arms 104 and 106 carry a finger or lug member 110 which functions to raise the door during its release and in cooperation with a vertical surface 112 of the housing 12 provide a handle-stop in the carrying position. Advantageously, door member 32 may also be lightly upwardly biased by any conventional means such as a leaf spring (not shown) so as to urge the door to a slightly raised position once its arm 94 is released.

Preferably, handle member 100 is located on the viewer such that its pivot point or its operation fulcrum is close to the vertical plane of the housing 12 which also passes through its center of gravity of the apparatus. Of course, while location away from this plane will effect the attitude of the housing 12 during carrying of the viewer, it will not defeat the carrying function of the handle.

Those familiar with the motion picture arts will readily appreciate the novel and highly unique advantages of this invention which provides an inexpensive and efficient loading arrangement for facilitating insertion and removal of a film cassette in a direction which is related to the overall operation of the apparatus and the position of the operator during such operation. Hence, the loading mechanism is particularly adapted for incorporation into a compact rear projection viewer to permit the operator to rapidly operate motion picture film cassettes with a minimum of effort. Further, an exterior light seal is provided in the vicinity of the cassette-receiving chamber, and the loading mechanism also efficiently locates the cassette within the apparatus in a positive operative engagement with interfacing components of the latter.

It should be understood that this invention may be practiced or embodied in still other ways without departing from the spirit or essential character thereof. Hence, the preferred embodiment herein is illustrative and not restrictive, the scope of the invention being indicated by the appended claims and all variations which come with the meaning of the claims are intended to be embraced therein.

What is claimed is:

1. Photographic apparatus for use with a motion picture film cassette, having an opening therein and means for advancing such film past such opening for facilitating projection of images recorded on a film strip carried in such cassette, said apparatus comprising:

a housing having an opening configured to facilitate the insertion of such cassette into and subsequent removal of such cassette from said apparatus;

first means carried within said housing for projecting such images in a given direction towards the front face of said housing when such cassette is positioned at a predetermined location within said apparatus;

second means, displaceably mounted on said housing for movement between a first position and a second position, for receiving such cassette in a direction from the front of said housing when said second means is in its said first position and for positioning such cassette at said predetermined location within said apparatus when said second means is displaced to its said second position;

third means for driving such film advancing means of such cassette, said driving means mounted within said housing for displacement between a first position in engagement with such advancing means when such cassette is positioned within said apparatus and a second position spaced from such advancing means; and fourth means responsive to movement of said second means for displacing said third means between its said first and second positions when said second means is displaced between its said second and first positions.

2. The apparatus of claim 1 wherein said second means includes a guide member configured to slideably receive such cassette, and said guide member is displaceably mounted on said housing for movement between a first position, wherein at least a portion of said guide member is located exteriorly of said housing and disposed to slideably receive such cassette in a direction from the front of said housing, and a second position wherein at least said portion of said guide member is located interiorly of said housing.

3. The apparatus of claim 1 wherein said second means additionally includes means for excluding light from entering said housing opening when said second means is in its said second position.

4. The apparatus of claim 1 wherein said second means includes an elongated guide member having its longitudinal axis disposed approximately normal to the front face of said housing, said guide member having an open front end configured to slideably receive such cassette, and said guide member is displaceably mounted on said housing for movement between a first position wherein at least said front end of said guide member is located exteriorly of said housing and a second position wherein said front end is located within said housing.

5. The apparatus of claim 4 wherein said guide member is mounted for pivotal movement around an axis normal to its said longitudinal axis such that said front end of said guide member may be pivotally displaced from a position exteriorly of said housing to a position interiorly of said housing.

6. Photographic apparatus for use with a motion picture film cassette having an opening therein and means for advancing such film past such opening, said apparatus comprising:

a housing having an opening configured to facilitate insertion of such cassette into and subsequent removal of such cassette from said apparatus;

means for driving such film advancing means of such cassette, said driving means mounted within said housing for displacement between a first position in engagement with such advancing means when such cassette is positioned within said apparatus and a second position spaced from such advancing means;

means, displaceably mounted on said housing for movement between a first and a second position, for receiving such cassette when said receiving means is in its said first position and for positioning such cassette within said apparatus when said receiving means is displaced to its said second position; and means responsive to movement of said receiving means for displacing said driving means between its said first and second positions when said receiving means is displaced between its said second and first positions.

7. The apparatus of claim 6 wherein said receiving means includes a guide member displaceable between a first position wherein it is configured to receive such cassette and a second position wherein it locates such cassette in an operative position within said housing, a closure member displaceably mounted on said housing for movement between a first position wherein it blocks said housing opening and a second position wherein it does not block said housing opening, and means responsive to movement of said closure member for displacing said guide member between its said first and second positions when said closure member is displaced between its said second and first positions.

8. The apparatus of claim 6 additionally including means for projecting images recorded on such film carried in such cassette in a forward direction towards the front face of said housing, and wherein said receiving means includes a guide member adapted to slideably receive such cassette when it advanced in a given direction, and said guide member mounted on said housing such that when said receiving means is in its said first position, said given direction is a rearward direction.

9. Photographic apparatus for use with a motion picture film cassette having an opening therein and including means for advancing a film strip housed therein past such opening, said apparatus comprising:

a housing having an opening therein configured to facilitate insertion of such cassette into and subsequent removal of such cassette from said apparatus;

means for driving such advancing means of such cassette, said driving means mounted within said housing for displacement between a first position in engagement with such advancing means of such cassette when the latter is positioned within said apparatus and a second position spaced from such advancing means;

a closure member displaceably mounted on said housing for movement between a first position wherein it blocks said housing opening and a second position wherein it does not block said housing opening; and means responsive to movement of said closure member for displacing said driving means between its said first and second positions when said closure member is displaced between its said first and second positions.

10. The apparatus of claim 9 including means for substantially excluding light from entering said housing opening in the vicinity of said closure member when it is in its closed position.

11. The apparatus of claim 9 additionally including sealing means configured for engagement between the periphery of said closure member and said housing when said closure member is in its closed position so as to exclude light from entering said housing opening.

12. The apparatus of claim 9 additionally including means for receiving such cassette when said closure member is located in its said second position and for positioning such cassette in an operative location when said closure member is located in its said first position, and means for coupling said receiving means to said closure member for displacement of said receiving means between its said second and first positions when said closure member is displaced between its said first and second positions.

13. The apparatus of claim 12 wherein said coupling means additionally includes lost motion means for precluding movement of said receiving means from its said second position during initial displacement of said closure member from its said first position, and said means for displacing said driving means is responsive to said initial movement of said closure member such that said driving means is displaced to its said second position spaced from such cassette, prior to displacement of the latter from its operative location.

14. The apparatus of claim 13 additionally including means for biasing said receiving means away from said closure member and towards the interior of said housing such that said receiving means positions such cassette within said housing in said operative location prior to final movement of said closure member to its first position.

15. The apparatus of claim 13 wherein said closure member is a door pivotally mounted on said housing, for displacement between an open position adjoining said housing opening and a closed position thereacross, said receiving means includes a guide member configured to slideably receive such cassette at an open end of said guide member, and said coupling means including a lost motion member joining said guide member to the underside of said door such that said guide member is at least partially drawn from said housing opening when said door is in its said open position, is carried within said opening when said door is moved to its said closed position, and remains fixedly positioned within said opening during subsequent initial opening of said door.

16. Photographic apparatus for use with a motion picture film cassette having an opening therein and means for advancing a film strip housed within such cassette past such opening, said apparatus comprising:

a housing having an opening configured to facilitate insertion of such cassette into and subsequent removal of such cassette from said apparatus;

first means for driving such film advancing means of such cassette, said driving means mounted within said housing for displacement between a first position in engagement with such advancing means when such cassette is positioned within said apparatus and a second position spaced from such advancing means;

second means for receiving such cassette when said second means is in a first position and for positioning such cassette in an operative location within said housing when said second means is in a second position;

third means for displacing said second means between its said first and second positions, said third means displaceably mounted on said housing for movement between a first and second position;

fourth means responsive to movement of said third means for displacing said driving means between its said first and second positions when said third means is displaced to or from its said first position;

fifth means for providing lost motion coupling between said second and third means such that said second means remains in its second position during initial movement of said third means from its second position such that such cassette is maintained in its operative position during displacement of said driving means.

* * * * *